US010932633B2

(12) United States Patent
Lee

(10) Patent No.: US 10,932,633 B2
(45) Date of Patent: Mar. 2, 2021

(54) APPARATUS FOR GENERATING A VORTEX FOR A VACUUM CLEANER

(71) Applicant: SAMSUNG ELECTRONICS CO., LTD., Suwon-si, Gyeonggi-do (KR)

(72) Inventor: Kyung Hoon Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 813 days.

(21) Appl. No.: 14/663,597

(22) Filed: Mar. 20, 2015

(65) Prior Publication Data

US 2015/0369255 A1  Dec. 24, 2015

(51) Int. Cl.
A47L 9/16 (2006.01)
F04D 29/36 (2006.01)
A47L 5/22 (2006.01)
F04D 17/16 (2006.01)

(52) U.S. Cl.
CPC ............. *A47L 9/1608* (2013.01); *A47L 5/22* (2013.01); *A47L 9/16* (2013.01); *A47L 9/1666* (2013.01); *A47L 9/1675* (2013.01); *A47L 9/1683* (2013.01); *F04D 17/16* (2013.01); *F04D 29/36* (2013.01)

(58) Field of Classification Search
CPC ........ A47L 9/1666; A47L 5/22; A47L 9/1675; A47L 9/1683; A47L 9/16; A47L 9/1608; B01D 45/12; B01D 45/14; F04D 29/36
USPC ................. 15/347, 353, 352; 55/406, DIG. 3
See application file for complete search history.

(56) References Cited

U.S. PATENT DOCUMENTS

| 2,365,676 | A | * | 12/1944 | Burkhalter, Jr. | ........ B64C 11/44 416/160 |
| 4,238,210 | A | * | 12/1980 | Regehr | ................. B01D 45/12 55/396 |
| 5,350,432 | A | | 9/1994 | Lee | |
| 6,601,265 | B1 | | 8/2003 | Burlington | |
| 7,204,672 | B2 | * | 4/2007 | Sewell | ..................... B63B 1/32 180/117 |
| 2004/0068826 | A1 | * | 4/2004 | Howie | ................... A47L 9/188 15/353 |

(Continued)

FOREIGN PATENT DOCUMENTS

GB 713083 * 4/1954 ............... B04C 5/02
JP 2007-29150 2/2007

(Continued)

OTHER PUBLICATIONS

British Search Report dated Nov. 27, 2014 in corresponding British Patent Application GB1410884.9.

(Continued)

*Primary Examiner* — Laura C Guidotti
(74) *Attorney, Agent, or Firm* — Staas & Halsey LLP

(57) ABSTRACT

An apparatus for generating a vortex in a collection vessel of a vacuum cleaner, using a blade assembly rotatably mountable in the collection vessel. By rotating the blade assembly, a vortex is generated inside the collection vessel, and enough suction is created to draw air through the entire system. The use of a blade assembly to generate the vortex may remove the need for an impeller external to the collection vessel, as the blade assembly may be capable of creating enough suction to draw air into the collection vessel. This may allow the vacuum cleaner to operate with lower noise.

17 Claims, 8 Drawing Sheets

(56) References Cited

U.S. PATENT DOCUMENTS

| | | |
|---|---|---|
| 2004/0191063 A1 | 9/2004 | Sewell |
| 2009/0123293 A1* | 5/2009 | Gierer .................. A47L 5/22 417/17 |
| 2012/0317748 A1 | 12/2012 | Van Der Kooi et al. |

FOREIGN PATENT DOCUMENTS

| | | |
|---|---|---|
| JP | 2009-56034 | 3/2009 |
| KR | 10-2007-0000634 | 1/2007 |
| WO | 2012/111949 A1 | 8/2012 |

OTHER PUBLICATIONS

Great Britain Examination Report dated Aug. 1, 2017 in corresponding Great Britain Patent Application No. GB1410884.9.
United Kingdom Intellectual Property Office issued Patents Act 1977 Examination Report under Section 18(3) in Patent Application No. GB 1410884.9 dated Jul. 27, 2018 (3 pages).
United Kingdom Intellectual Property Office issued Patents Act 1977 Examination Report under Section 18(3) in Patent Application No. GB 1410884.9 dated Oct. 9, 2018 (3 pages).
British Office Action dated Jun. 25, 2019 in corresponding British Patent Application No. GB1410884.9.
British Office Action dated May 2, 2019 in corresponding British Patent Application No. GB1410884.9.

* cited by examiner

FIG. 6 A
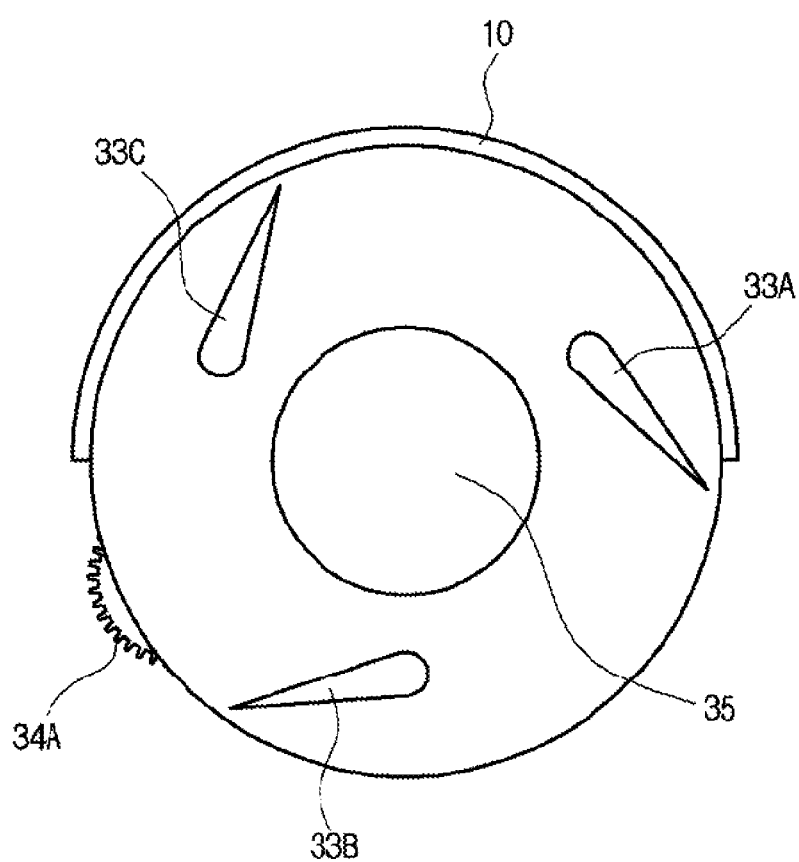

APPARATUS FOR GENERATING A VORTEX FOR A VACUUM CLEANER

CROSS-REFERENCE TO RELATED APPLICATIONS

This application claims the benefit of UK Patent Application No. 1410884.9, filed on Jun. 19, 2014 in the UK Intellectual Property Office, the disclosure of which is incorporated herein by reference.

BACKGROUND

1. Field

The present invention relates to an apparatus for generating a vortex, for use in a vacuum cleaner.

2. Description of the Related Art

Many types of vacuum cleaner are currently commercially available, including upright vacuum cleaners and canister (also known as cylinder) vacuum cleaners. These vacuum cleaners can be broadly divided into two categories—those with a dust collection bag and those without a dust collection bag, often referred to as bagless vacuum cleaners.

There has been considerable interest in bagless vacuum cleaners in recent years due to their potential advantages. For example, the suction in bagless vacuum cleaners is not reduced by build up of dust in a bag, and a user can see how much dust has accumulated inside the transparent collection vessel of a bagless vacuum cleaner. Bagless vacuum cleaners generally work on a cyclonic separation principle, removing particulates from air using one or more vortices.

In conventional cyclonic vacuum cleaners, an aerodynamic vortex is generated inside the vacuum cleaner by forcing air to flow into a collection vessel at high speed and at an angle that is tangential to the wall of the vessel. This, together with the shape of the collection vessel, causes the air to rotate and form a vortex. The suction required to draw air into the vacuum cleaner is produced by an impeller, typically located at an inlet side of the collection vessel, which is driven by a motor. As a result of the power required to generate the high speed airflow into the collection vessel, cyclonic vacuum cleaners can be noisy. Furthermore, a user has no control over the movement of the particulates inside the collection vessel.

SUMMARY

According to an aspect of the invention, there is provided an apparatus for generating a vortex in the collection vessel of a vacuum cleaner, comprising a blade assembly comprising a plurality of blades mounted to a support member, the blade assembly being rotatably mountable in the collection vessel.

The use of a blade assembly to generate the vortex may remove the need for an impeller external to the collection vessel, as the blade assembly may be capable of creating enough suction to draw air into the apparatus. This may allow the apparatus to operate with lower noise. However, the invention is not limited to this arrangement and embodiments may include both an external impeller and the blade assembly.

The blades may be symmetrically disposed around the periphery of the support member.

The support member may be substantially circular.

The support member may have a central aperture to allow air to flow through the centre of the blade assembly.

The blades may be fixedly mounted to the support member.

The blades may be movable relative to the support member.

The angle of each of the blades relative to their direction of motion may be adjustable, to allow a user to control the movement of air inside the collection vessel.

The apparatus may further comprise a gear assembly for adjusting the angle of the blades.

The gear assembly may comprise a plurality of first gears mounted to the support member, each of the first gears being connected to a respective blade by an axle.

The gear assembly may further comprise a second gear arranged to mesh with each of the first gears for adjusting the angle of each of the blades by the same amount.

The gear assembly may further comprise a third gear for meshing with the second gear to allow a user to control the angle of each of the blades by turning a single gear.

The blade assembly may comprise three blades.

The blades may have a symmetric aerofoil shape.

The blades may have a cambered aerofoil shape.

The apparatus may comprise a plurality of vanes around the periphery of the blade assembly.

The blade assembly may comprise a driven gear having a plurality of teeth around the periphery of the support member for engaging with a driving gear of a motor.

According to another aspect of the invention, there is provided a vacuum cleaner including a collection vessel and a blade assembly comprising a plurality of blades mounted to a support member, the blade assembly being rotatably mounted in the collection vessel.

The collection vessel may comprise an air inlet in a side of the collection vessel.

The air inlet may be below the blade assembly.

The air inlet may be arranged such that air is drawn into the collection vessel at an angle that is tangential to the wall of the vessel. This may assist with the generation and maintenance of a vortex in the body of the collection vessel.

The collection vessel may comprise a collection chamber at the bottom of the vessel for collecting dust, which may be removable for disposal of the dust.

The support member may have a central aperture, and further comprise a filter above the central aperture arranged to remove dust particles from air exiting the collection vessel. This allows light particles which are not removed by the vortex to be separated from the airflow.

According to a further aspect of the invention, there is provided a vortex generating apparatus for a vacuum cleaner, the apparatus comprising a blade assembly having a plurality of blades, which when rotated within a container, generate a vortex.

The blades may be supported by a support member.

BRIEF DESCRIPTION OF THE DRAWINGS

Embodiments of the invention will now be described by way of example with reference to the accompanying drawings, in which:

FIG. 6A illustrates a bottom-up view of the blade assembly shown in FIG. 5 with the blades of the blade assembly at a first angle;

DETAILED DESCRIPTION

Figure 1A:
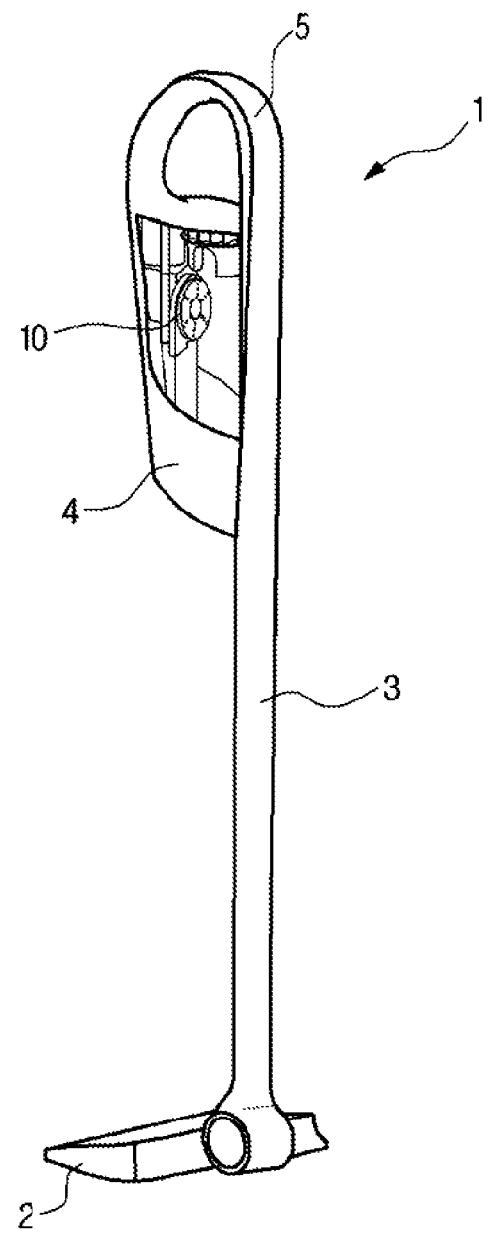
FIG. 1A illustrates an upright vacuum cleaner including a blade assembly according to an embodiment of the invention.
Figure 1B:
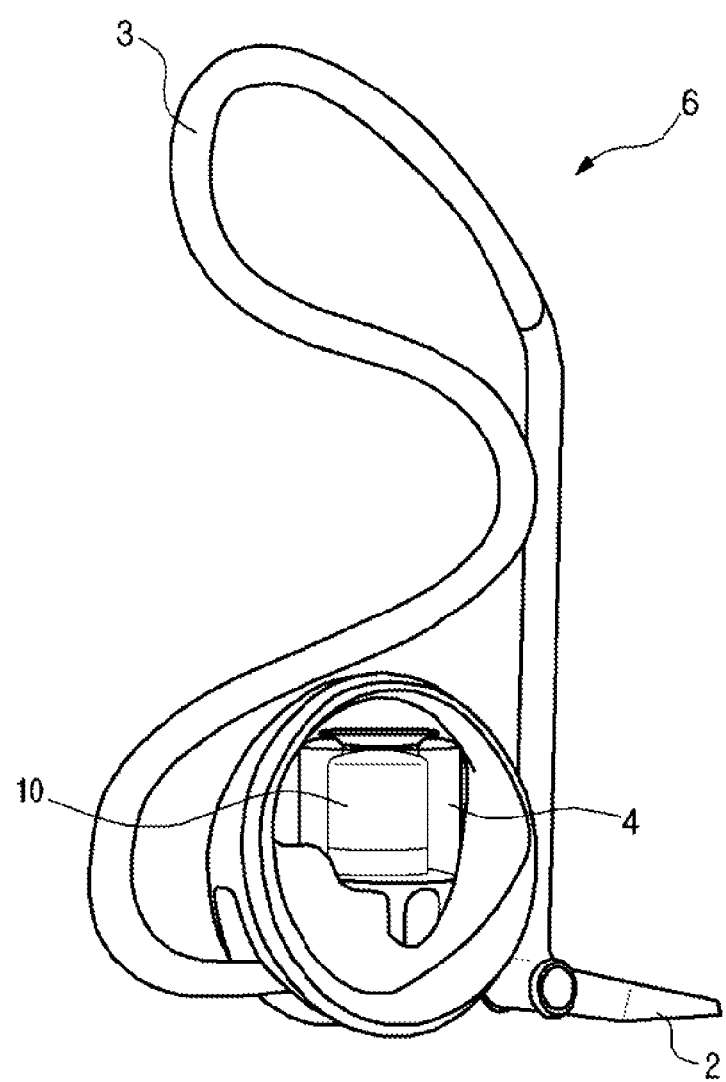
FIG. 1B illustrates a canister vacuum cleaner comprising a blade assembly according to another embodiment.

FIGS. 1A and 1B illustrate two common types of vacuum cleaner, being an upright cleaner and a canister (or cylinder) cleaner. The invention is not however limited to use in these types of vacuum cleaner, but can be implemented in any type of vacuum cleaner that uses the principle of cyclonic separation.

Referring to FIG. 1A, an upright vacuum cleaner 1 has a cleaning head 2, a tube or hose 3 connecting the cleaning head to a housing 4, and a handle 5. Air enters the vacuum cleaner 1 through the cleaning head 2 and travels up the tube 3 into a collection vessel 10 mounted within the housing 4. The suction required to draw air into the vacuum cleaner 1 is created inside the housing 4 by a vortex generating assembly, which will be described in more detail below.

In another embodiment shown in FIG. 1B, a canister vacuum cleaner 6 comprises a cleaning head 2, a hose 3 and a housing 4. As in the vacuum cleaner 1 shown in FIG. 1A, air enters the vacuum cleaner 6 through the cleaning head 2 and travels along the hose 3 into a collection vessel 10 mounted within the housing 4. The suction required to draw air into the vacuum cleaner 1 is created inside the housing 4.

Figure 2:
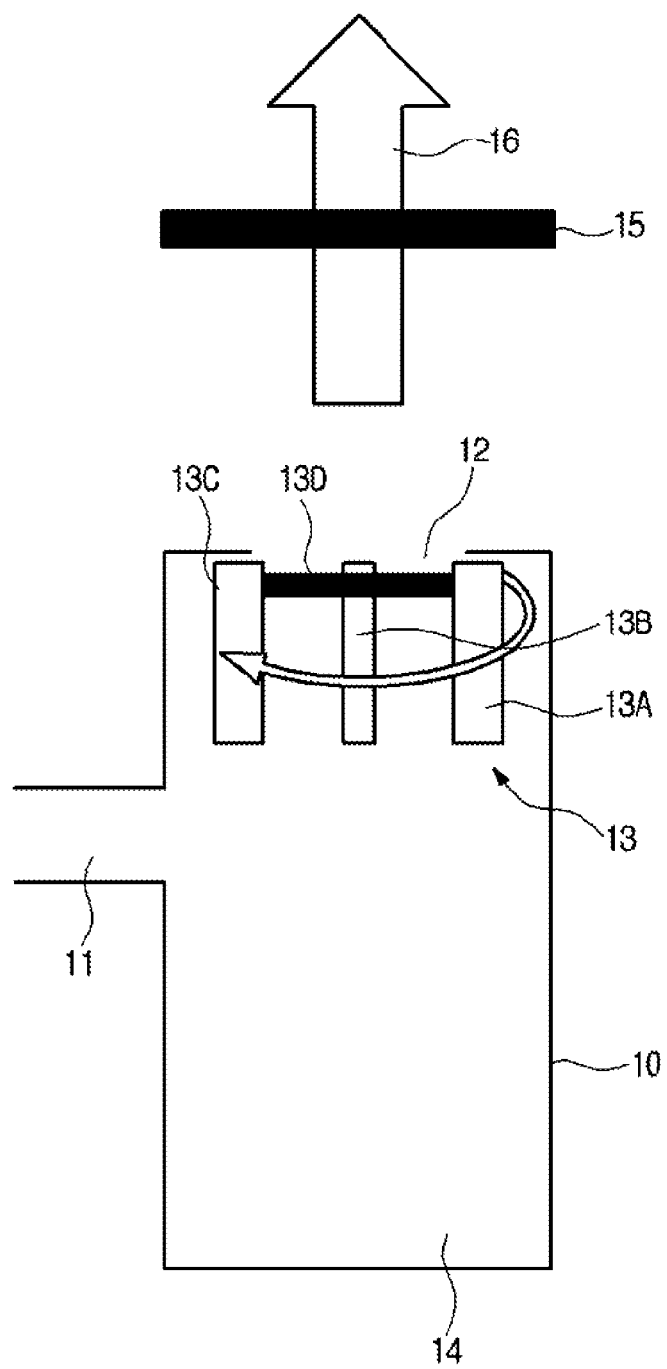
FIG. 2 is a schematic cross-sectional view of the vortex generating apparatus usable in the vacuum cleaners of FIGS. 1A and 1B.

FIG. 2 is a schematic cross-sectional view of the vortex generating apparatus that can be used in the vacuum cleaners of FIGS. 1A and 1B and other cyclonic vacuum cleaners. The skilled person would appreciate that while the exact configuration and dimensions of the vortex generating apparatus would differ between different types and models of vacuum cleaner, the basic principles are the same.

Referring to FIG. 2, a collection vessel 10, which is a container in which the vortex is generated, includes an inlet 11 in a side-wall of the vessel through which air enters the collection vessel, an outlet 12 at the top of the vessel through which air leaves the collection vessel, and a blade assembly 13 rotatably mounted in the top portion of the collection vessel. The blade assembly 13 comprises a first blade 13A, a second blade 13B and a third blade 13C, each mounted to a common support member 13D. The support member 13D holds the blades 13A, 13B, 13C in position relative to one another and may be a substantially circular, or annular, ring to which the blades are mounted, so providing a central aperture through which air can flow. Various configurations for the blades and the support member will be described in detail below.

The blade assembly 13 may be driven by a motor or other driving device (not shown). As the blade assembly 13 rotates relative to the collection vessel, the blades 13A, 13B, 13C cause the air inside the collection vessel 10 to flow in a vortex-like motion, thus generating a vortex. The vortex may force light particulates, e.g. hair, into the centre of the collection vessel 10, and heavy particulates to the collection vessel walls. The light particulates then travel along with the airflow up through the centre of the blade assembly 13 to the outlet 12, whilst the heavy particulates fall to the bottom of the collection vessel where they accumulate. This has the effect of separating heavy particulates from the airflow. The bottom of the collection vessel 14 may comprise a separate collection chamber for collecting the particulates, and the collection chamber may be detachable from the rest of the collection vessel 10 to allow for disposal of the accumulated particulates.

The rotation of the blade assembly 13 causes a pressure differential between the central region of the collection vessel 10, where there is relatively low pressure, and the side regions of the collection vessel 10, where there is relatively high pressure. This pressure differential has the effect of producing enough suction to draw air through the entire system. The apparatus may therefore be capable of both generating a vortex and producing enough suction to draw air into the apparatus. As such, there may be no need to provide an impeller external to the apparatus so that the apparatus may operate at a lower noise level. Additionally, since the means by which suction is generated is provided inside the collection vessel with the vortex, it may be possible to provide the same suction power with a smaller sized cyclonic vacuum cleaner.

Referring again to FIG. 2, a filter 15 may be provided above the central aperture of the blade assembly 13, through which air 16 exiting from the outlet 12 passes, and where light particulates may be further removed from the airflow.

The blades 13A, 13B, 13C may have an aerofoil shape, for example a symmetric aerofoil or a cambered aerofoil. Cambered aerofoils may include reflex aerofoils, wedge shaped aerofoils and flattened aerofoils, among many others. The shape of the blades is not limited to any specific shape, as long as they have the effect of producing a vortex when rotated.

Furthermore, while the above embodiment refers to three blades, the invention is not limited thereto, and any number of blades may be provided as long as they are capable of generating a vortex. However, simulations show that three aerofoil blades symmetrically disposed around the periphery of a support member may provide improved results over other configurations.

Figure 3:
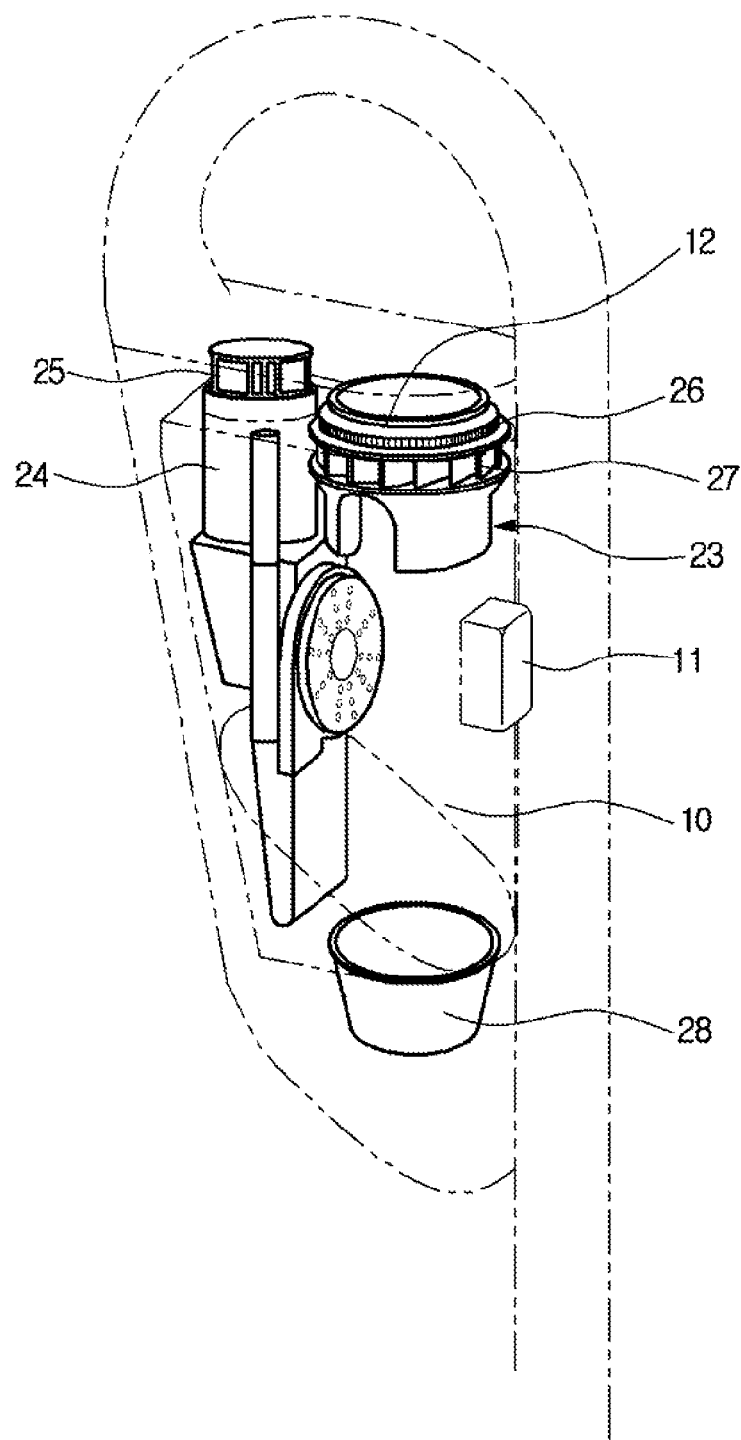
FIG. 3 is a perspective view of a collection vessel and blade assembly of a vacuum cleaner in accordance with an embodiment.
Figure 4:
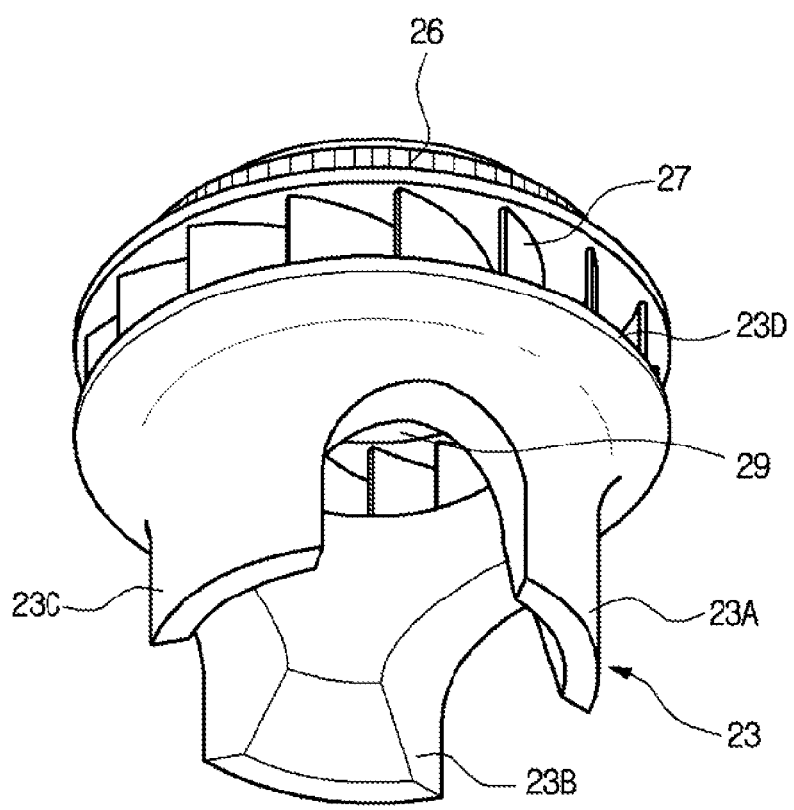
FIG. 4 illustrates the blade assembly shown in FIG. 3 in more detail.

FIG. 3 is a perspective view of a collection vessel 10 disposed in the housing 4 of an upright vacuum cleaner, by way of illustration only. FIG. 4 is a more detailed perspective view of the blade assembly 23.

Referring to FIGS. 3 and 4, the collection vessel 10 may have a substantially cylindrical shape to facilitate the formation of a vortex. An inlet 11 through which air enters the collection vessel is provided in the side of the collection vessel below the blade assembly, and an outlet 12 through which air exits is provided at the top of the collection vessel. Heavy particulates from the airflow which fall to the bottom of the collection vessel 10 may accumulate in a collection chamber 28, which can then be removed for disposal of the accumulated particulate matter.

The blades 23A, 23B, 23C of the blade assembly 23 are mounted to and extend downwards from a support member 23D. In this embodiment, the blades, which have a cambered aerofoil shape, are fixed to the support member 23D so that they cannot move relative to the support member. The blades may be made of a substantially rigid material, or they may be made of a relatively flexible material so that, even if fixed in position, the blades may flex as they are rotated. However, the invention is not limited either to the blades being fixedly mounted or to the specific shape of the aerofoil, or to specific materials or rigidity.

The support member 23D may be an annular ring, with the blades being fixed at an outer portion of the ring. The support member 23D may be integrally formed with the blades, for example by a moulding process. The support member 23D may have a central aperture 29 which allows air loaded with light particles to flow through the centre of the blade assembly 23 for filtration.

As described above, the blades 23A, 23B, 23C are symmetrically disposed around the periphery of the support member 23D and the rotation of the support member about its central axis causes the blades 23A, 23B, 23C to move in a circle, thus generating a vortex. The principle of operation of the vortex and its effects are described above and will not be repeated here. A motor 24 may be provided adjacent to the blade assembly 23 and mechanically coupled to the blade assembly to drive its rotation. This may be achieved by engaging a driving gear 25 of the motor with a driven gear 26 of the blade assembly, the driven gear 25 comprising an annular ring disposed on top of the support member 23D, so that the gear teeth are exposed at the periphery of the support member. This configuration allows the central aperture 29 at the top of the blade assembly to be maintained clear to allow for the flow of air, but the configuration is not limited to this.

In some embodiments, the blade assembly 23 may further comprise a plurality of vanes 27 around the periphery of the support member 23D.

Figure 5:
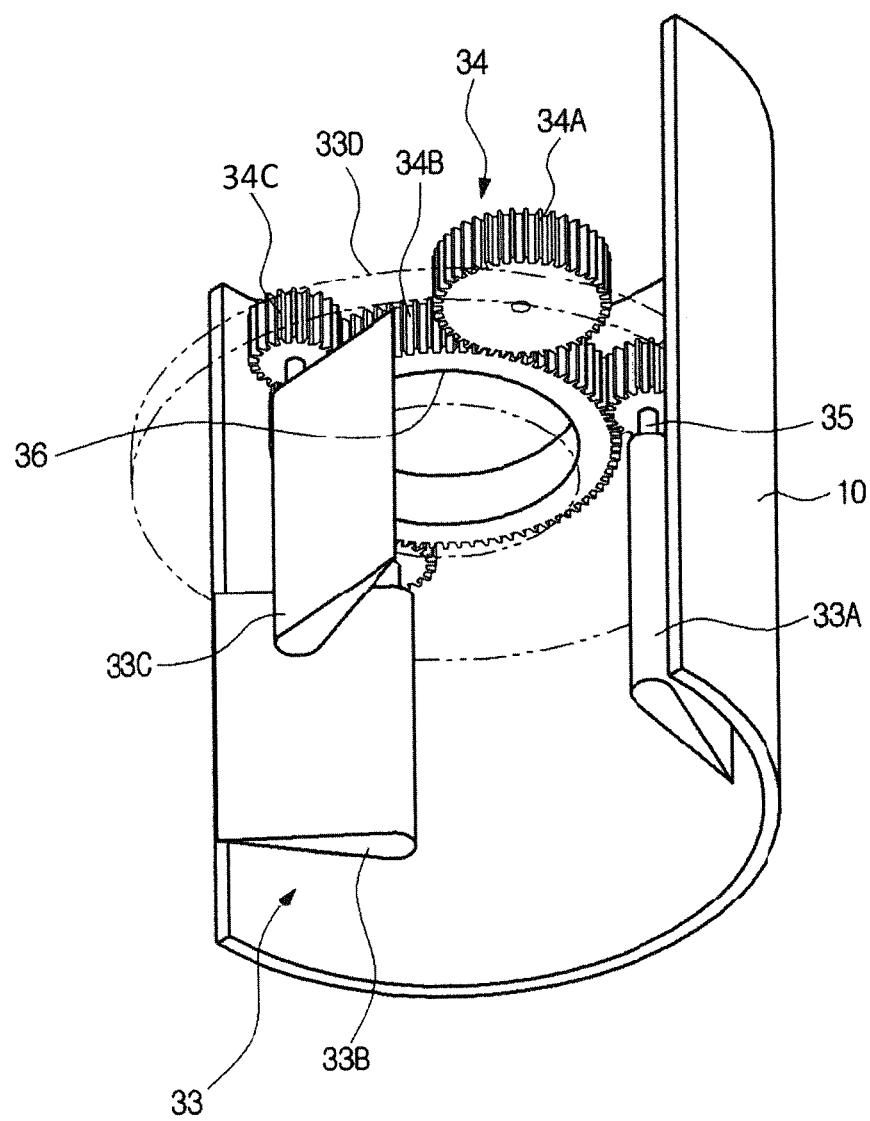
FIG. 5 illustrates a blade assembly according to another embodiment of the present invention.

Referring to FIG. 5, in an alternative embodiment, a blade assembly 33 may comprise three blades 33A, 33B, 33C which are mounted to and extend downwards from a support member 33D, which is a substantially circular disk. The support member 33D may form the lid of the collection vessel 10. A central aperture 36 in the annular disk allows air to flow through the centre of the blade assembly 33.

The blades 33A, 33B, 33C are symmetrically disposed around the periphery of the support member and the rotation of the support member 33D about its central axis causes the blades 33A, 33B, 33C to move in a circle, thus generating a vortex. The principle of operation of the vortex and its effects are described above and will not be repeated here. In this embodiment, the blades 33A, 33B, 33C have symmetric aerofoil shapes, and the collection vessel 10 may have a substantially cylindrical shape to facilitate the formation of a vortex.

In this embodiment each of the blades 33A, 33B, 33C may be mounted to the support member 33D by a corresponding axle 35. Each of the axles 35 may pass through a corresponding hole in the support member 33D and extend into the leading edge side of a corresponding blade, thus fixing to the blade. The blade is mounted to the support member by a gear arrangement which is described in more detail below. The precise mounting arrangement of the axle to the blade and the blade to the supporting member is not limited to the above arrangement, as long as the rotation of the blade assembly 33 still generates a vortex.

The angle of the blades 33A, 33B, 33C relative to their direction of motion may be adjusted by rotating the axles 35 to which they are attached. This may be achieved through the use of a gear assembly 34 comprising a control gear 34A, a coupling gear 34B and axle gears 34C. The control gear 34A meshes with the coupling gear 34B which is in turn meshed with the axle gears 34C. Each axle gear 34C is attached to a corresponding axle 35 which extends through the centre of the axle gear. Rotating the control gear 34A transfers torque to the coupling gear 34B which then simultaneously rotates the axle gears 34C. Since the axle gears 34C are attached to the axles 35, the axles also rotate. This alters the angle of each of the blades relative to their direction of motion by the same amount. As such, the angle of the blades relative to their direction of motion may be adjusted by turning a single control gear 34A.

Although in this embodiment the blades are attached to the support member by axles, the invention is not limited to this. For example, the blades may be attached to the support member by an adhesive or one or more screws. Alternatively, the blades may be integrally formed with the support member, for example by a moulding process. In general, any method of attaching the blades to the support member may be used. This includes methods in which the blades are fixed relative to the support member and methods in which the blades can be moved relative to the support member.

Figure 6B:
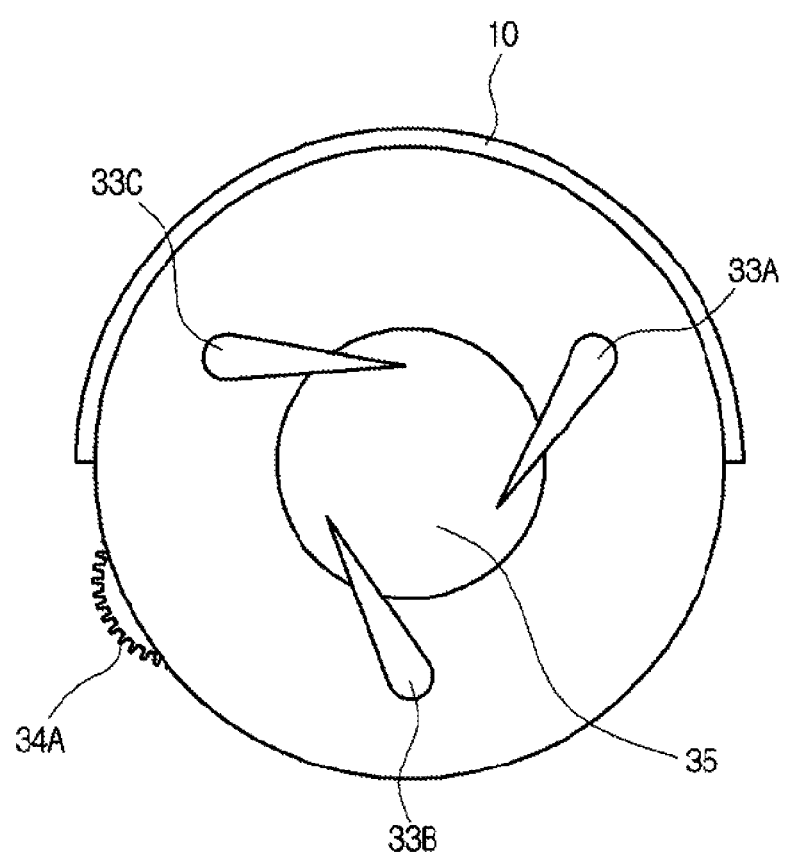
FIG. 6B illustrates a bottom-up view of the apparatus with the blades of the blade assembly at a second angle.

FIGS. 6A and 6B are bottom-up views looking up at the blades 33A, 33B, 33C from the bottom of the collection vessel, showing the blades 33A, 33B, 33C in different orientations.

Referring to FIG. 6A, the blades 33A, 33B, 33C of the blade assembly 33 are shown at a first angle to their direction of motion. The control gear 34A may be rotated so that the blades are adjusted clockwise to be at a different angle, as shown in FIG. 6B. Although not shown, the blades may also be rotated anti-clockwise. The range of angles through which the blades may be adjusted is not limited to that shown in FIG. 6A and FIG. 6B. For example, the blades may be rotated until their outermost edges are in contact with the inner wall of the collection vessel 10, so allowing for scraping of the collection vessel walls.

The blades may also be rotated to different positions in accordance with preset operating modes. Adjusting the angle of the blades 33A, 33B, 33C allows the movement of air within the collection vessel 10 to be controlled, for example to dislodge any trapped particulates that need moving, or to control the size of particulates which are separated from the airflow.

Although a number of embodiments of the invention have been described above, it will be understood that many variations and modifications are possible without departing from the scope of the invention as defined in the claims. Furthermore, different features of the embodiments may be combined with one another or substituted for one another. For example, the blades used in the embodiment illustrated in FIG. 4 may be made movable rather than fixed.

What is claimed is:

1. An apparatus comprising:
 a collection vessel having therein a motor having a driving gear,
 a support member, and
 a blade assembly rotatably mounted in the collection vessel and including
  a driven gear, and
  a plurality of blades mounted to the support member, wherein
  the plurality of blades extends downwards from the support member to be spaced apart from one another in a circumferential direction of the blade assembly,
  the plurality of blades is rotated by the driven gear of the blade assembly engaged with the driving gear of the motor, to thereby generate a suction force and a vortex within the collection vessel,
  the collection vessel has an air inlet and an air outlet,
  the air inlet is configured to direct suctioned air and particles from a surface external to the apparatus into the collection vessel through the suction force generated by the blade assembly, and the air outlet is configured to direct the suctioned air out of the collection vessel through the blade assembly using the vortex generated by the blade assembly and the plurality of blades is movable relative to the support member.

2. The apparatus according to claim 1, wherein at least some of the plurality of blades are symmetrically disposed around a periphery of the support member.

3. The apparatus according to claim 1, wherein an angle of each of the plurality of blades relative to a direction of motion is adjustable.

4. The apparatus according to claim 3, further comprising a gear assembly configured to adjust the angle of the plurality of blades.

5. The apparatus according to claim 4, wherein the gear assembly comprises a plurality of first gears mounted to the support member, each of the plurality of first gears being connected to a respective one of the plurality of the blades by an axle.

6. The apparatus according to claim 5, further comprising a second gear arranged to mesh with each of the plurality of first gears and configured to adjust the angle of each of the plurality of blades by a same amount.

7. The apparatus according to claim 6, further comprising a third gear configured to mesh with the second gear.

8. The apparatus according to claim 1, wherein the plurality of blades comprising three blades.

9. The apparatus according to claim 1, wherein at least some of the plurality of blades have a symmetric aerofoil shape.

10. The apparatus according to claim 1, wherein at least some of the plurality of blades have a cambered aerofoil shape.

11. The apparatus according to claim 1, comprising a plurality of vanes around a periphery of the support member.

12. The apparatus according to claim 1, wherein the driven gear has a plurality of teeth around a periphery of the support member configured to engage with the driving gear of the motor.

13. A vacuum cleaner comprising:
a collection vessel having therein a motor having a driving gear,
a support member, and
a blade assembly rotatably mounted in the collection vessel and including
a driven gear, and
a plurality of blades mounted to the support member, wherein
the plurality of blades extend downwards from the support member to be spaced apart from one another in a circumferential direction of the blade assembly,
the plurality of blades are rotated the driven gear of the blade assembly engaged with the driving gear of the motor, to thereby generate a suction force and a vortex within the collection vessel,
the collection vessel has an air inlet and an air outlet,
the air inlet is configured to direct suctioned air and particles from a surface external to the vacuum cleaner into the collection vessel through the suction force generated by the blade assembly, and
the air outlet is configured to direct the suctioned air out of the collection vessel through the blade assembly using the vortex generated by the blade assembly, and
wherein the support member has a central aperture, and the vacuum cleaner further comprises a filter above the central aperture arranged to remove fine particles from air exiting the collection vessel.

14. The vacuum cleaner according to claim 13, wherein the air inlet is located on a side of the collection vessel.

15. The vacuum cleaner according to claim 14, wherein the air inlet is located below the blade assembly.

16. The vacuum cleaner according to claim 14, wherein the air inlet is arranged such that the suctioned air is drawn into the collection vessel at an angle that is tangential to the wall of the vessel.

17. The vacuum cleaner according to claim 13, wherein the collection vessel comprises a collection chamber at the bottom for collecting dust.

* * * * *